United States Patent
Matsui

(10) Patent No.: US 8,807,656 B2
(45) Date of Patent: Aug. 19, 2014

(54) VEHICLE SEAT

(75) Inventor: Hayato Matsui, Chiryu (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 265 days.

(21) Appl. No.: 13/339,430

(22) Filed: Dec. 29, 2011

(65) Prior Publication Data
US 2012/0175931 A1 Jul. 12, 2012

(30) Foreign Application Priority Data

Jan. 11, 2011 (JP) ................................. 2011-002954

(51) Int. Cl.
*B60N 2/22* (2006.01)
*B60N 2/44* (2006.01)

(52) U.S. Cl.
USPC ...................................................... 297/463.1

(58) Field of Classification Search
USPC .................................. 297/361.1, 463.1, 463.2
See application file for complete search history.

(56) References Cited

U.S. PATENT DOCUMENTS

| | | | | |
|---|---|---|---|---|
| 3,953,069 A * | 4/1976 | Tamura et al. | ............ | 297/367 R |
| 3,958,828 A * | 5/1976 | Ishida et al. | ................ | 297/361.1 |
| 4,394,048 A * | 7/1983 | Sakurai et al. | ............ | 297/367 R |
| 4,437,703 A * | 3/1984 | Nishikori et al. | ............. | 297/362 |
| 4,461,511 A * | 7/1984 | Berneking et al. | ........ | 297/354.12 |
| 4,466,661 A * | 8/1984 | Narita | ........................ | 297/367 R |
| 6,120,098 A * | 9/2000 | Magyar et al. | ............. | 297/367 R |
| 7,293,838 B2 * | 11/2007 | Sugama et al. | ............. | 297/378.1 |
| 7,494,186 B2 * | 2/2009 | Paing et al. | ............... | 297/378.12 |
| 2003/0006642 A1 * | 1/2003 | Eppert et al. | ................ | 297/463.1 |

FOREIGN PATENT DOCUMENTS

| DE | 102005055703 | * | 5/2007 |
|---|---|---|---|
| JP | 2006-76547 | | 3/2006 |

* cited by examiner

*Primary Examiner* — Peter Brown
(74) *Attorney, Agent, or Firm* — Greenblum & Bernstein, P.L.C.

(57) ABSTRACT

A vehicle seat includes a seat main body having a seat cushion and a seat back which are connected via a reclining device, a shaft member which protrudes from the reclining device, and an operation lever which is connected to the shaft member and is rotated when operating the reclining device. The operation lever includes a lever main body which is attached to the shaft member, a sliding portion which is provided on the lever main body and configured to slide relative to the seat main body when the lever main body is rotated about the shaft member, and a protruding portion which protrudes from the lever main body toward the seat main body at a position further separated apart from the shaft member than the sliding portion and is brought into contact with the seat main body when the lever main body is tilted by an external force.

5 Claims, 6 Drawing Sheets

VEHICLE SEAT

BACKGROUND OF THE INVENTION

1. Field of the Invention

The present invention relates to a vehicle seat.

2. Description of the Related Art

JP 2006-76547 A discloses a vehicle seat. The vehicle seat includes a seat cushion, a seat back which is connected to the seat cushion in an angle adjustable manner via a reclining device, a shaft member which protrudes from the reclining device, and an operation lever which is connected to the shaft member and is rotated about the shaft member when operating the reclining device.

Recently, there is a demand for reducing a size of a reclining device. As the reclining device becomes smaller, a diameter of the shaft member is reduced. Accordingly, the welding length of an operation lever welded on the outer peripheral surface of the shaft member becomes shorter, and thus an adhesive strength between the operation lever and the shaft member is lowered. As a result, there is a possibility that the operation lever is inadvertently tilted relative to the shaft member by an external force. Therefore, there is required a structure in which an operation lever is effectively prevented from being tilted inadvertently relative to the shaft member when the operation lever receives an external force.

SUMMARY OF THE INVENTION

According to an illustrative embodiment of the present invention, there is provided a vehicle seat comprising: a seat main body including a seat cushion and a seat back which are connected to each other in an angle adjustable manner via a reclining device; a shaft member which protrudes from the reclining device; and an operation lever which is connected to the shaft member and is rotated about the shaft member when operating the reclining device. The operation lever includes: a lever main body which is attached to the shaft member and extends from the shaft member in a first direction; a sliding portion which is provided on the lever main body and configured to slide relative to the seat main body when the lever main body is rotated about the shaft member; and a protruding portion which protrudes from the lever main body toward the seat main body at a position further separated apart from the shaft member than the sliding portion and which is configured to be brought into contact with the seat main body when the lever main body is tilted relative to the shaft member by an external force.

According to the above configuration, since the sliding portion of the operation lever is brought into contact with the seat main body when the operation lever is in a normal operation state, the operation lever is supported by the seat main body via the sliding portion. Further, when the lever main body is tilted relative to the shaft member by an external force in an unexpected direction, the lever main body is tilted relative to the shaft member and the protruding portion is brought into contact with the seat main body at a position further separated apart from the shaft member than the sliding portion. That is, the protruding portion can be subjected to the same torque by a small force compared to the sliding portion. Accordingly, the force and torque applied on the lever main body can be effectively received by a contact between the protruding portion and the seat main body rather than the sliding portion. As a result, it is possible to effectively prevent the operation lever from being tilted inadvertently relative to the shaft member.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
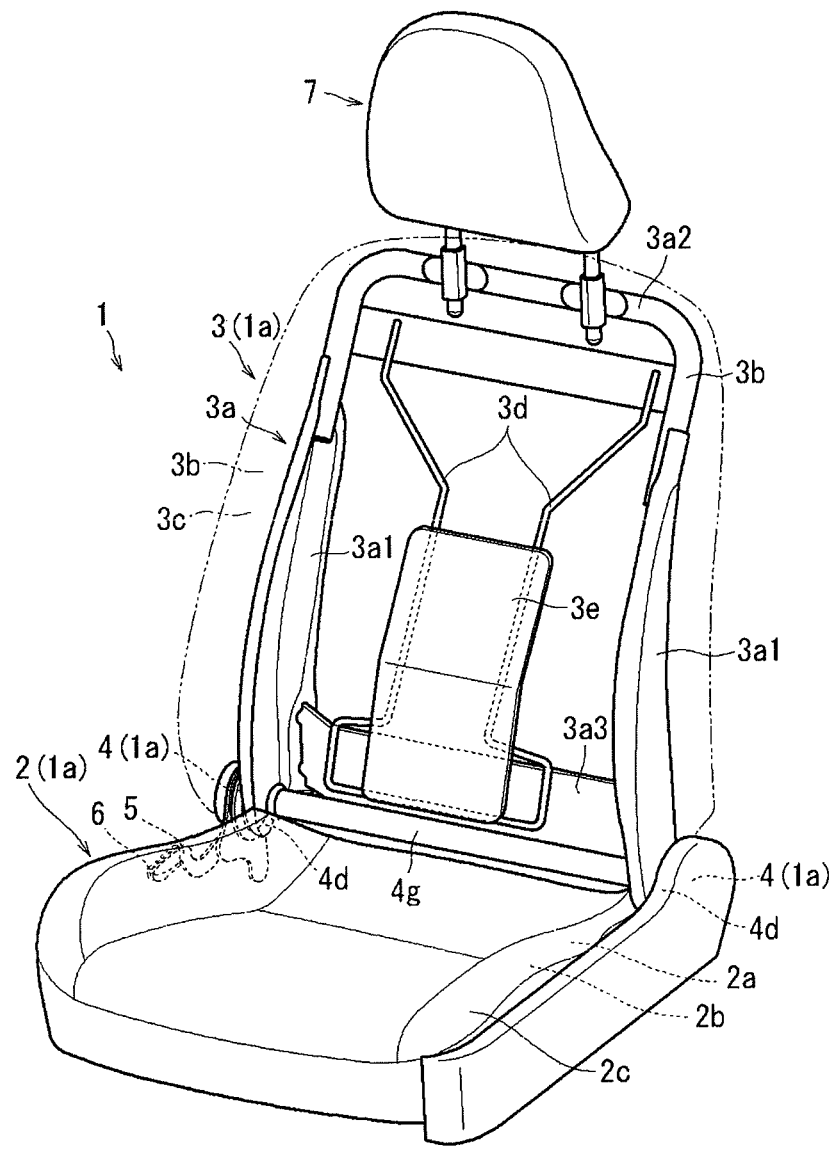
FIG. 1 is a perspective view illustrating a vehicle seat according to an illustrative embodiment.

Hereinafter, a vehicle seat according to an illustrative embodiment of the present invention will be described in detail with reference to FIGS. 1 to 6. As shown in FIG. 1, a seat 1 includes a seat cushion 2 and a seat back 3 and is mounted on a vehicle such as an automobile or the like. The seat back 3 is attached to a rear part of the seat cushion 2 in an angle adjustable manner via a reclining device 4. The seat cushion 2 includes a frame 2a, a pad 2b mounted on the frame 2a and a skin 2c covering a surface of the pad 2b. Similarly, the seat back 3 includes a frame 3a, a pad 3b mounted on the frame 3a and a skin 3c covering a surface of the pad 3b.

As shown in FIG. 1, the frame 3a of the seat back 3 includes left and right side frames 3a1 extending in a vertical direction, an upper frame 3a2 connecting upper parts of the left and right side frames 3a1 and an under frame 3a3 connecting lower parts of the left and right side frames 3a1. A support plate 3e is mounted between the upper frame 3a2 and the under frame 3a3 by a wire 3d. The pad 3a is mounted on the front part of the support plate 3e.

Figure 2:
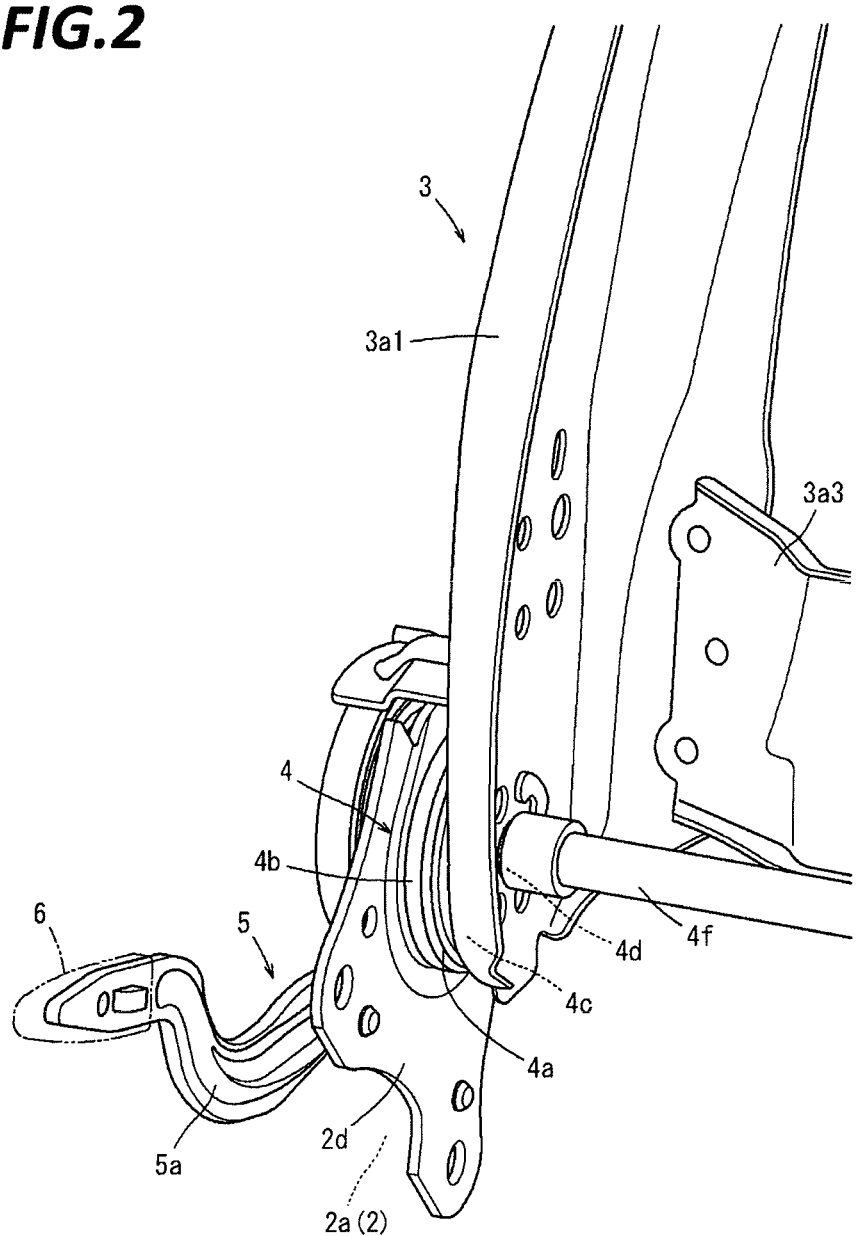
FIG. 2 is a perspective view illustrating a portion of the vehicle seat in the vicinity of an operation lever.

As shown in FIG. 2, the reclining device 4 includes a first member 4a, a second member 4b and a lock mechanism 4c. The first member 4a and the second member 4b are disc-shaped, respectively, and mounted rotatably relative to each other. The first member 4a is attached to the outer side of the side frame 3a1 of the seat back 3. The second member 4b is attached to a plate-shaped bracket 2d which, in turn, is attached to a rear part of the frame 2a of the seat cushion 2.

As shown in FIG. 2, the lock mechanism 4c is provided between the first member 4a and the second member 4b to releasably lock the first member 4a and the second member 4b. A shaft member 4d which extends in an axial direction is provided at a central portion of the first member 4a and the second member 4b. The shaft member 4d is connected to the lock mechanism 4c and rotates to operate the lock mechanism 4c. As the shaft member 4d rotates, the lock mechanism 4c is configured to switch the first member 4a and the second member 4b between a non-rotatable lock state and a rotatable unlock state.

As shown in FIG. 1, the reclining devices 4 are provided on left and right sides of the seat 1. The shaft members 4d provided in the left and right relining devices 4 are connected and interlocked to each other via a connecting rod 4g. An operation lever 5 is attached to one outside end of the shaft member 4d.

Figure 3:
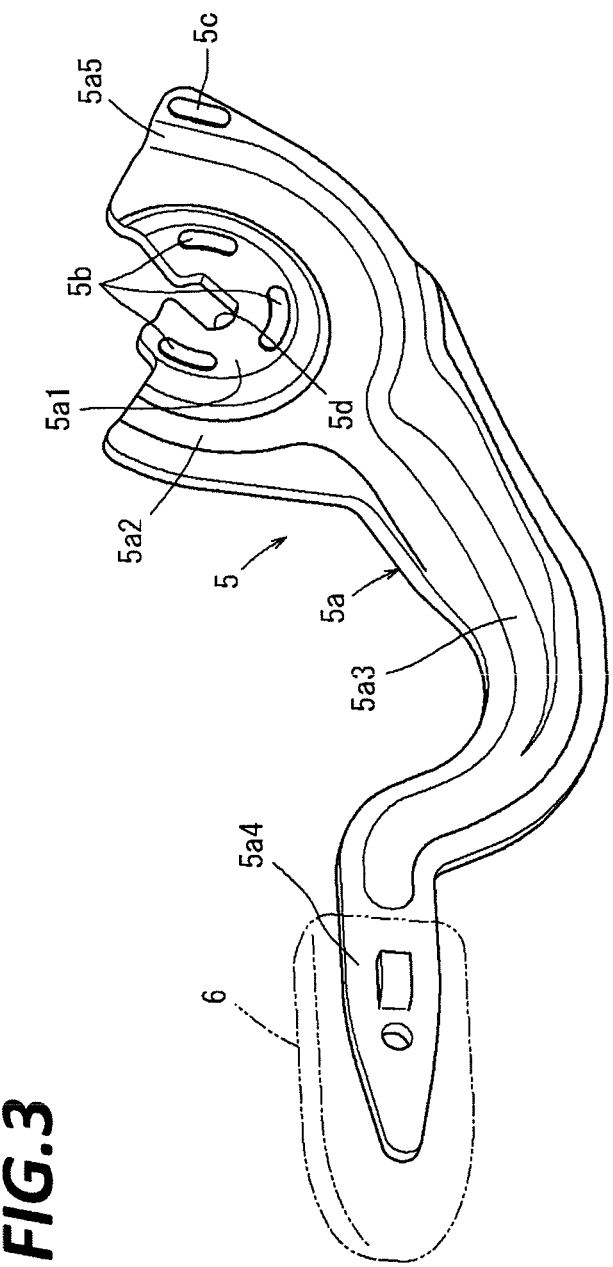
FIG. 3 is a perspective view illustrating the operation lever.
Figure 4:
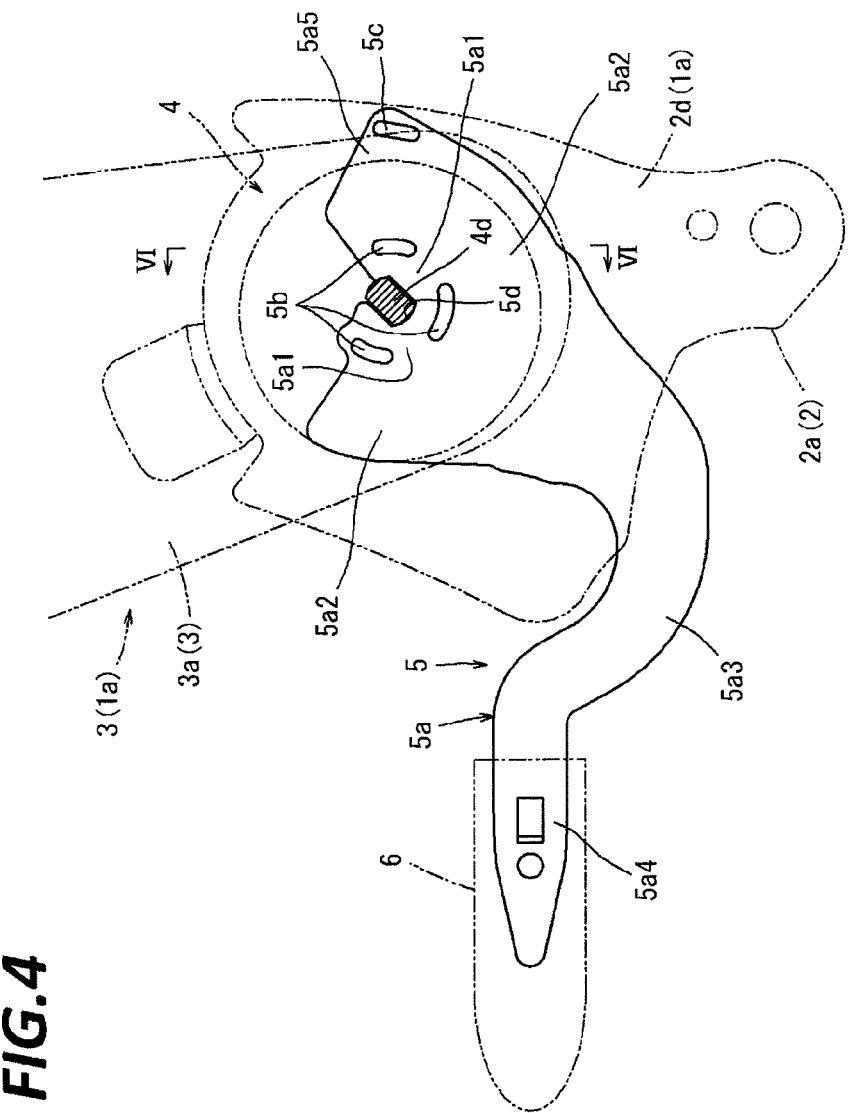
FIG. 4 is a side view illustrating the operation lever as viewed from a center side of the vehicle seat.

The operation lever 5 includes a metal lever main body 5a, as shown in FIGS. 3 and 4. The lever main body 5a includes an attachment portion 5a1 which is attached to the shaft member 4d and an arc-shaped portion 5a2 which is formed on the outer peripheral edge part of the attachment portion 5a1. The attachment portion 5a1 is formed with a non-circular hole 5d corresponding to the shaft member 4d, into which the shaft member 4d is inserted. The outer peripheral surface of the shaft member 4d and the attachment portion 5a1 are joined to each other by welding or the like. A plurality of sliding portions 5b are provided in an outer peripheral region of the attachment portion 5a1.

Figure 6:
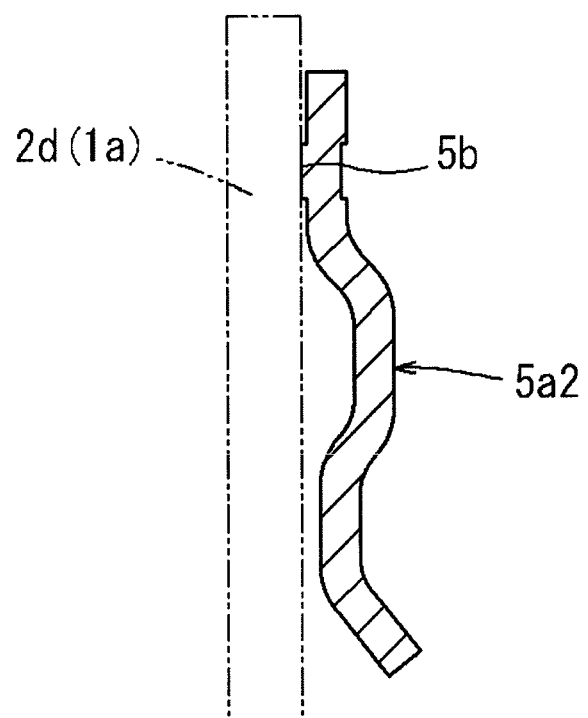
FIG. 6 is a sectional view taken along line VI-VI of FIG. 4.

As shown in FIGS. 4 and 6, the sliding portions 5d are formed at positions respectively corresponding to a front side, a lower side and a rear side of the shaft member 4d and extend in an arc shape around the shaft member 4d. The sliding portions 5d protrude from the attachment portion 5a1 toward the bracket 2d (the seat main body 1a) and are configured to slide relative to the bracket 2d when the operation lever 5 is rotated.

Further, as shown in FIGS. 4 and 6, the arc-shaped portion 5a2 extends along an outer peripheral edge of the attachment portion 5a1 and protrudes in a direction of separating apart from the bracket 2d. A first extension portion 5a3 extending forward is provided at a front end edge of the arc-shaped portion 5a2. A second extension portion 5a5 extending rearward is provided at a rear end edge of the arc-shaped portion 5a2.

Figure 5:
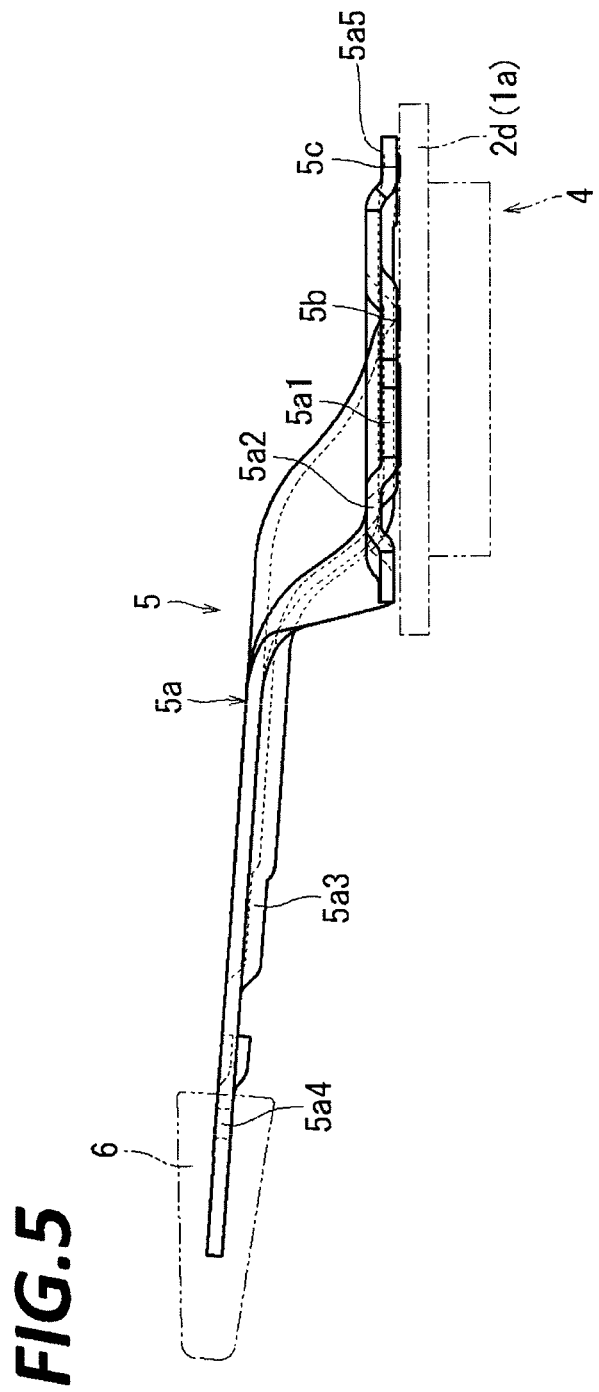
FIG. 5 is a plan view illustrating the operation lever.

The first extension portion 5a3 extends forward from the arc-shaped portion 5a2 and also extends in a direction of separating apart from the bracket 2d, as shown in FIGS. 4 and 5. A resin handle 6 is provided on a leading end part 5a4 of the first extension portion 5a3. The second extension portion 5a5 extends rearward from a rear part of the arc-shaped portion 5a2 and also extends in a direction being directed to the bracket 2d and then extends along the bracket 2d. The second extension portion 5a5 is formed with the protruding portion 5c.

As shown in FIGS. 4 and 5, the protruding portion 5c is located at a position rearward of the shaft member 4d and in the vicinity of an end edge of the second extension portion 5a5. The protruding portion 5c protrudes from the second extension portion 5a5 toward the bracket 2d (the seat main body 1a). Accordingly, it is possible to prevent the second extension portion 5a5 from moving toward the seat main body 1a by the protruding portion 5c.

For example, as the front end of the lever main body 5a is subjected to a force in a direction being spaced apart from the seat main body 1a, the lever main body 5a is tilted relative to the shaft member 4d in a width direction thereof. Consequently, when the second extension portion 5a5 moves toward the seat main body 1a, the protruding portion 5c is brought into contact with the bracket 2d. In this way, it is possible to suppress the lever main body 5a from being tilted relative to the shaft member 4d.

In a normal state, the protruding portion 5c may be brought into contact with the bracket 2d, but it is preferable that the protruding portion is not brought into contact with the bracket 2d. Specifically, if the protruding portion 5c is not brought into contact with the bracket 2d, a sliding resistance between the protruding portion 5c and the bracket 2d is not generated when the operation lever 5 is normally rotated, so that the rotation of the operation lever 5 is not interfered.

When an angle of the seat back 3 is adjusted, a user lifts up a handle 6, as shown in FIGS. 1 and 2. Accordingly, the operation lever 5 rotates about the shaft member 4d and thus the left and right shaft members 4d are axially rotated by the connecting rod 4g. As the shaft members 4d rotate, the lock mechanism 4c is actuated against an urging member (not shown) so that the left and right reclining devices 4 are switched from the lock state to the unlock state. In this way, the seat back 3 is capable of rotating relative to the seat cushion 2 in a predetermined angle. When an actuation of the operation lever 5 is released, the reclining devices 4 are switched to the lock state and the seat back 3 cannot rotate relative to the seat cushion 2.

As shown in FIG. 4, the seat 1 includes the seat main body 1a having the seat cushion 2 and the seat back 3 which are connected to each other in an angle adjustable manner via the reclining device 4; the shaft member 4d which protrudes from the reclining device 4; and the operation lever 5 which is connected to the shaft member 4d and configured to rotate about the shaft member 4d when operating the reclining device 4. The operation lever 5 includes a lever main body 5a which is attached to the shaft member 4d and extends from the shaft member 4d in a first direction, a sliding portion 5b which is provided on the lever main body 5a and configured to slide relative to the seat main body 1a when the lever main body 5a rotates about the shaft member, and a protruding portion 5c which protrudes from the lever main body 5a toward the seat main body 1a at a position separated apart from the shaft member 4d than the sliding portion 5b and configured to be brought into contact with the seat main body 1a when the lever main body 5a is tilted relative to the shaft member 4d by an external force.

In this way, since the sliding portion 5b of the operation lever 5 is brought into contact with the seat main body 1a when the operation lever 5 is in a normal operation state, the operation lever 5 is supported by the seat main body 1a via the sliding portion 5b. Further, when the lever main body is tilted relative to the shaft member 4d by an external force in an unexpected direction, the lever main body 5a is tilted relative to the shaft member 4d and the protruding portion 5c is brought into contact with the seat main body 1a at a position separated apart from the shaft member 4d than the sliding portion 5b. That is, the protruding portion 5c can be subjected to the same torque by a small force compared to the sliding portion 5b. Accordingly, the force and torque applied on the lever main body 5a can be effectively supported by a cooperation of the protruding portion 5c and the seat main body 1a rather than the sliding portion 5b. As a result, it is possible to effectively prevent the operation lever 5 from being tilted inadvertently relative to the shaft member 4d.

The sliding portion 5b protrudes from the lever main body 5a toward the seat main body 1a, as shown in FIGS. 3 and 6. Accordingly, owing to the sliding portion 5b, a portion of the lever main body 5a except the sliding portion 5b can be prevented from being brought into contact with the seat main body 1a. Therefore, the sliding resistance can be reduced when the operation lever 5 is normally rotated.

As shown in FIG. 4, the lever main body 5a includes the second extension portion 5a5 which extends relative to the shaft member 4d in a second direction (the rearward direction) opposite to the first direction (the forward direction) and the protruding portion 5c is provided on the extension portion 5a5. Accordingly, when a leading end of the lever main body 5a in the first direction is subjected to a force which causes the leading end to be spaced apart from the seat main body 1a, the lever main body 5a is tilted relative to the shaft member 4d and the extension portion 5a5 on a side opposite to the leading end moves toward the seat main body 1a, so that the protruding portion 5c is brought into contact with the seat main body 1a. In this way, the tilting of the lever main body 5a relative to the shaft member 4d can be suppressed by the seat main body 1a via the extension portion 5a5 and the protruding portion 5c.

While the present invention has been shown and described with reference to certain illustrative embodiments thereof, it will be understood by those skilled in the art that various changes in form and details may be made therein without departing from the spirit and scope of the invention as defined by the appended claims. For example, although the protruding portion 5c of the operation lever 5 in the above-described illustrative embodiment is brought into contact with the bracket 2d when the operation lever 5 is tilted relative to the shaft member 4d, the protruding portion 5c may be brought into contact with the frame 2a of the seat cushion 2, the frame 3a of the seat back 3 or the like.

Further, although the sliding portion 5b of the operation lever 5 in the above-described illustrative embodiment slidably moves relative to the bracket 2d during the rotation of the operation lever 5, the sliding portion 5b may slidably move relative to the frame 2a of the seat cushion 2 or the frame 3a of the seat back 3. The protruding portion 5c may protrude from the attachment portion 5a1 toward the bracket 2d. Alternatively, the protruding portion 5c does not protrude toward the seat main body 1a, but is provided on the entire or a part of the attachment portion 5a1 to slidably move relative to a portion protruding from the seat main body 1a toward the sliding portion 5c.

In the above-described illustrative embodiment, the operation lever 5 includes the first extension portion 5a3 extending forward from the shaft member 4d and the second extension portion 5a5 extending rearward from the shaft member 4d. Alternatively, the operation lever 5 may include a first extension portion extending upward from the shaft member 4d and a second extension portion extending downward from the shaft member 4d, or a first extension portion extending downward from the shaft member 4d and a second extension portion extending upward from the shaft member 4d, or a first extension portion extending rearward from the shaft member 4d and a second extension portion 5a5 extending forward from the shaft member 4d.

The seat 1 may be mounted on a automobile or may be mounted on other conveyance means (vehicle) such as a vessel or an aircraft.

What is claimed is:

1. A vehicle seat comprising:
    a seat main body including a seat cushion and a seat back which are connected to each other in an angle adjustable manner via a reclining device;
    a shaft member which protrudes from the reclining device; and
    an operation lever which is connected to the shaft member and is rotated about the shaft member when operating the reclining device,
wherein the operation lever includes:
    a lever main body which is attached to the shaft member and extends from the shaft member in a seat-forward direction;
    a sliding portion which is provided on the lever main body and is slidable relative to the seat main body when the lever main body is rotated about the shaft member; and
    a protruding portion which protrudes from the lever main body toward the seat main body at a position further separated apart from the shaft member than the sliding portion and which contacts the seat main body when the lever main body is tilted relative to the shaft member in a direction away from the seat main body by an external force to prevent an inadvertent tilt of the operation lever.

2. The vehicle seat according to claim 1,
wherein the sliding portion protrudes from the lever main body toward the seat main body.

3. The vehicle seat according to claim 1,
wherein the lever main body includes an extension portion which extends in a seat-rearward direction opposite to the seat-forward direction with respect to the shaft member, and the protruding portion is provided on the extension portion.

4. The vehicle seat according to claim 3,
wherein the lever main body further includes an attachment portion connected with the shaft member and an arc-shaped portion provided at outer peripheral edge part of the attachment portion,
wherein the arc-shaped portion protrudes in a direction separating apart from the seat main body, and
wherein the extension portion extends in the seat-rearward direction from an edge of the arc-shaped portion and in a direction toward the seat main body.

5. The vehicle seat according to claim 1,
wherein the sliding portion includes a plurality of sliding portions, each slide portion protruding from the lever main body toward the seat main body and having an arc shape around the shaft member.

* * * * *